United States Patent Office 3,331,399
Patented July 18, 1967

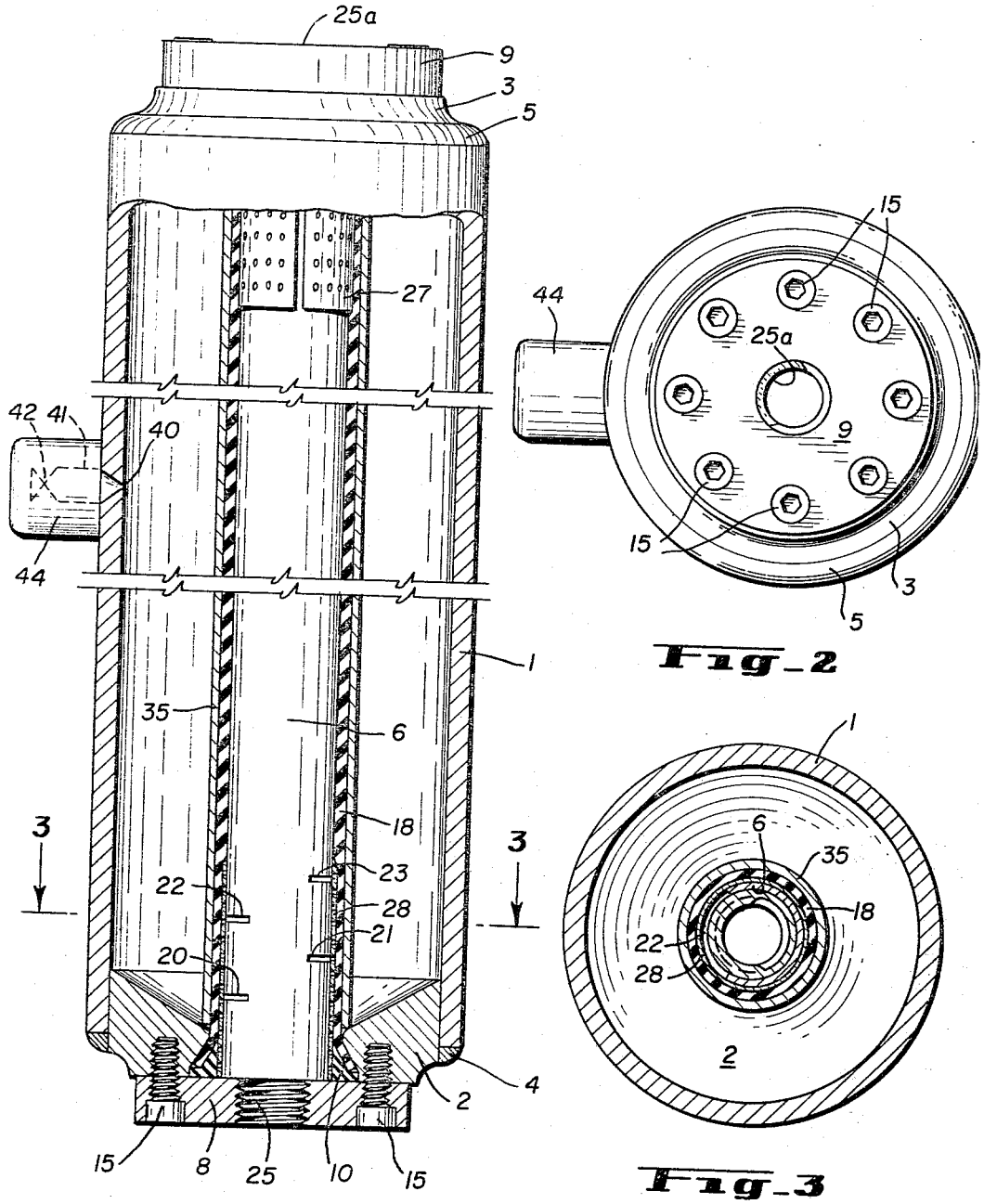

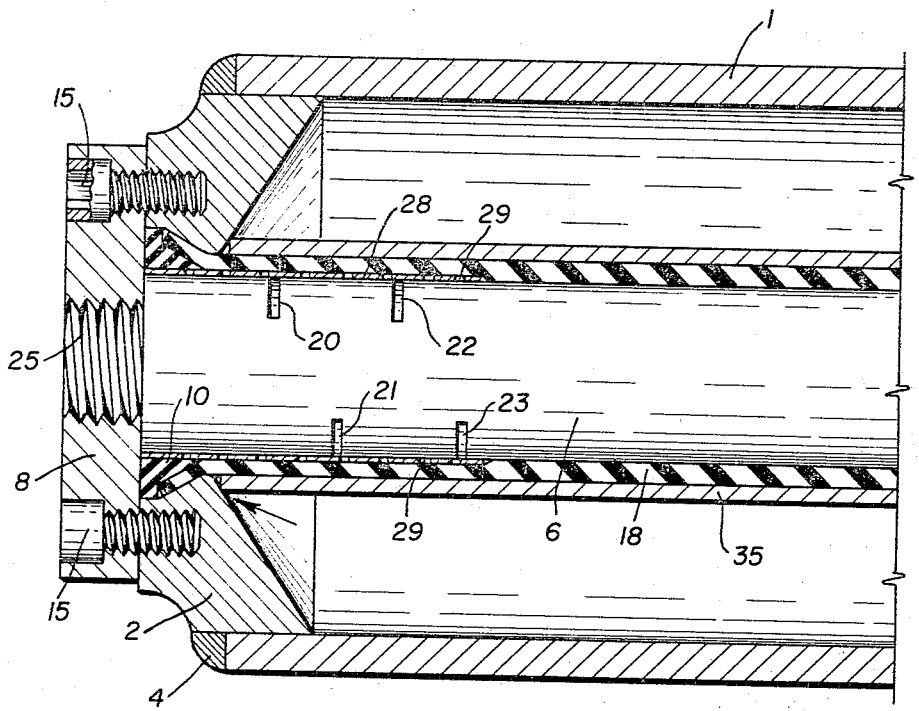
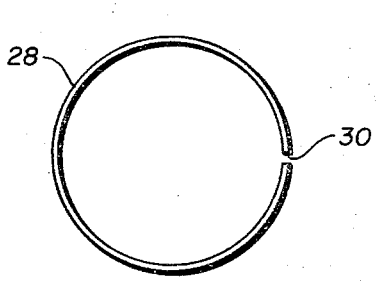
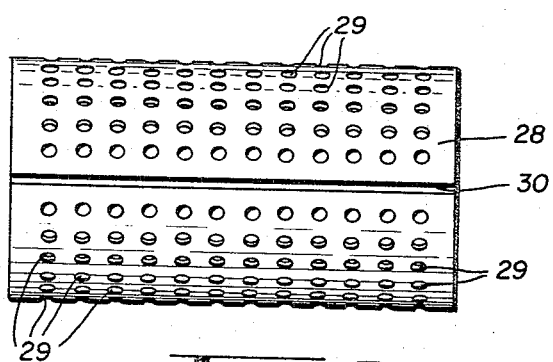
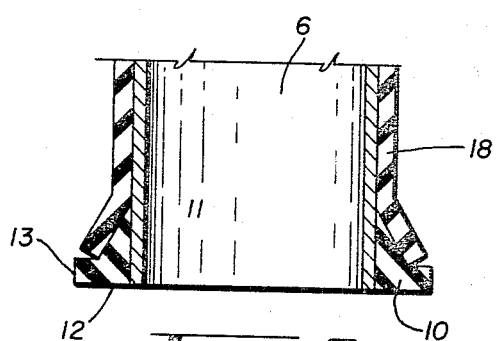

3,331,399
ACCUMULATOR
Kenneth J. Von Forell, 1440 S. Winona Way,
Denver, Colo. 80219
Filed Jan. 27, 1965, Ser. No. 428,521
4 Claims. (Cl. 138—30)

ABSTRACT OF THE DISCLOSURE

A tubular diaphragm accumulator having a flow tube provided with radial slots for pressure communication with the tubular diaphragm seal between liquid under pressure and a surge absorbing gas under pressure. The slots provide an area greater than the cross-sectional area of the flow tube for unrestricted surge capacity to the diaphragm. A conical seal flares outwardly at each end of the tubular diaphragm so as to cause tighter sealing under pressure in the flow tube.

---

This invention relates to accumulators or surge absorbing chambers and more particularly to improvements in in-line accumulators using a flexible, tubular diaphragm and a gaseous pre-charge absorption chamber.

Flowing liquid streams are subject to surges of pressure due to the fact that the liquid is essentially incompressible and motion changes are more or less transmitted throughout the liquid. Various types of surge absorbing chambers have been utilized in the prior art, and all use a gas, which is compressible, to absorb the shock waves which surge through the liquid.

Most commonly used surge absorbing chambers include a flexible diaphragm separating the flowing liquid and a gass pressure chamber. Surges of liquid in the flowing stream are absorbed by compressing the gas as the liquid actually depresses the flexible diaphragm into the gas.

It is an object of the invention to provide an inexpensive, simplified and highly efficient accumulator for fluid lines.

It is another object of the invention to provide a highly versatile accumulator for fluid lines which is long lived, is easily installed and maintained in a fluid system.

Yet another object of the invention is to provide an effective seal for a flexible tubular diaphragm.

A further object of the invention is to provide an accumulator in which the basic components are designed for operation under various types of service with minimum modification of few components of the accumulator for other conditions.

These and other objects and advantages of the invention may be readily ascertained by referring to the following description and appended illustrations, in which:

FIG. 1 is a partial cross-sectional view of an accumulator according to the invention;

FIG. 2 is an end elevation of the device of FIG. 1;

FIG. 3 is a cross-sectional view of an accumulator according to the invention taken along section line 3—3 of the device of FIG. 1;

FIG. 4 is an end elevational view of a high pressure guard for the liquid ports of an accumulator;

FIG. 5 is a side elevational view of the device of FIG. 4;

FIG. 6 is an enlarged detail section of an end of an accumulator illustrating the sealing mechanism according to the invention; and FIG. 7 is a detailed view of the seal for a tubular diaphragm.

In the modification selected for illustration, an outer shell, 1, which is normally a steel tube of a predetermined length, is provided with end caps 2 and 3 welded or otherwise secured at shoulders 4 and 5, respectively, to form a hermetic seal between the two. A flow tube 6 is telescoped in the outer shell 1. The flow tube 6 is a close fit between two end seal retainers 8 and 9 mounted on the end caps 2 and 3, respectively. An annular seal 10 is provided at each end between the seal retainer and the end cap. The seal is a resilient annular member which has a cross-sectional configuration of approximately triangular shape with an annular radial flange. The seal retainers are held in position by means of cap screws 15 threadedly retained in the end caps of the device. A resilient tubular diaphragm 18 extends from end to end internally of the shell and one end extends between and is retained between the cap 2 and the seal 10, and in the same manner the opposite end is retained between its seal and cap. Two lateral cuts 20 and 21 are arranged in the flow tube adjacent the lower end thereof and opposite two additional cuts 22 and 23. The cuts or ports are machined so that they extend about 120° around the flow tube and they are approximately ⅛ inch wide. Each seal retainer includes a threaded opening, i.e., threaded opening 25 in the seal retainer 8 for threaded attachment to a flow line, and opening 25a in the opposite end. The tube 6 fits close or tight between the two seal retainers 8 when the seal retainers are pulled down tight on the end caps. A short fine mesh screen member 27 encloses the ports at the upper end of the flow tube and a screen member 28 covers the ports in the flow tube at the lower end of the device. The screen as shown in FIGS. 4 and 5 includes a generally tubular member 28 having a plurality of small holes 29 throughout its extent. The screen has a peripheral length slightly less than the outer periphery of the flow tube 6 leaving a small gap 30 in the screen when placed on the flow tube. The screen member is retained on the flow tube by the resilient diaphragm 18, and is held in position by the seal 10 both during assembly and in use. The screen is useful when high pressures are used to prevent the high gas pressure from extending the diaphragm through the ports in the absence of liquid under pressure in the flow tube.

An outer resilient sleeve 35 which extends from the inside of one cap to the inside of the other cap is mounted over the resilient tube 6. The outer sleeve 35 acts as a retainer for the inner tubular diaphragm 18 and substantially increases the life of the flexible diaphragm. The sleeve may be of the same material as the diaphragm.

A small orifice or passage 40 is provided in the side of the tube 1 leading to a stem 41 and a valve 42, providing means for charging the space between the flexible diaphragm and the tube 1 with gas under pressure. A cap 44 covers the charging valve for protection.

In use, the device is arranged to be a part of a liquid line, and the pipe or conduit of the line may be threaded into the seal retainers by means of the threaded openings 25 and 25a. The annular space between the shell and the flexible diaphragm is then charged with a gas, through the valve 42, to a predetermined pressure. A small portion of the liquid flowing through the flow tube 6 from one end to the other may escape through the ports 20, 21, 22 and 23 when the pressure in the liquid exceeds the pressure of the gas in the space. A sudden surge forces the liquid through the ports expanding the diaphragm and compressing the gas in the annular space. The compression of the gas takes up the shock of the surge of pressure in the liquid. The gas pressure in the annular space and liquid passing through the ports between the flow tube and the diaphragm acts on the seal ring 10, forcing it against the seal retainer 8, against the end 2 and against the end of the flow tube 6. The resilient seal and the end of the diaphragm acutally flow against the metal forming a tighter seal under pressure.

The addition of the end of the flexible tubular diaphragm adds to the sealing effect and the greater the pressure the tighter the seal.

The unique arrangement of the annular seal 10 and the end of the tube causes the seal against the metal parts to become tighter as either the gas or liquid pressure becomes greater. As the liquid flows through the ports in the flow pipe to the inside of the tubular diaphragm, the gas pressure is, also, increased, forming a tighter seal of the resilient seal and diaphragm on the seal retainer, flow tube and end as well as between the two members themselves.

The retaining tube 35 greatly increases the life of the tubular diaphragm under frequent flexures and is highly useful in applications of high frequency of flexures or where the diaphragm has poor flexure qualities in relation to the operation. In actual tests, it has been shown that the exterior retaining tube 35, which must not be fastened to the diaphragm, increases the life of the tubular diaphragm by three or more times. Merely doubling the wall thickness or making the wall thickness of the tubular diaphragm the same thickness as the diaphragm plus the outer tube does not achieve the same result. In actual tests, it has been shown that a tubular diaphragm having a wall thickness equal to the sum of thickness of the two does not have the same life expectancy as a thinner tubular diaphragm within an exterior retaining tube, and specifically a diaphragm and outer tube of equal thickness has a life expectancy of substantially more than three times the life of a diaphragm with twice the wall thickness of the thinner diaphragm. The outer restraining tube may be a close fit on the tubular diaphragm and it should fit between the two end plates with very little play.

Under low and moderate pressures, the screen members are not necessary for covering the ports since the pressure is not sufficient to force or extrude the flexible diaphragm into the ports. However, under high pressures, either gas or liquid in the absence of the other, the flexible material flows into the ports where it may be cut or damaged, causing early failure in the tube. The screens prevent the flow of the flexible material into the ports. The screens are held in position by the flexible material so that they do not move when in assembled position.

The materials of construction of the accumulator are, of course, determined by the use to which it is to be placed. For a hydraulic line, a flow tube of aluminum, a flexible tubular diaphragm of neoprene is satisfactory. In such case, the shell may be of mild steel as will be the ends and caps. Stainless steel or material may be used where corrosion is a factor.

While the invention has been illustrated by reference to a particular embodiment, there is no intent to limit the spirit or scope of the invention to the precise details so set forth except as defined in the following claims.

I claim:
1. An accumulator comprising an inner tubular member, there being a plurality of lateral slots formed in said tubular member and each said slot being less than 180° of revolution of the periphery thereof; an outer tube enclosing said inner tubular member providing an annular space therebetween and including an end cap sealed on each end thereof, each said end cap provided with a central opening permitting passage of said inner tubular member, each said end cap having an outwardly flared opening providing a conical recess around said inner tubular member; a tubular, resilient diaphragm enclosing said inner tubular member, each end of said diaphragm extending into the adjacent recess; a resilient seal of a general conical cross-section mounted in each recess on said tubular member and telescoped inside the end of said diaphragm; a seal retainer secured to each said end cap and in general abutting relation to said inner tubular member thereby forcing said seal and diaphragm against said end cap and against said inner tubular member; means for connecting both said seal retainers to a liquid line; and means for maintaining gas under pressure in said annular space around said diaphragm.

2. An accumulator comprising an inner tubular member, there being a plurality of lateral narrow slots formed in said tubular member adjacent the ends thereof leaving the central portion of the member imperforate and each said slot being less than 180° of revolution of the periphery thereof; an outer tube enclosing said inner tubular member providing an annular space therebetween and including an end cap sealed on each end thereof, each said end cap provided with a central opening permitting passage of said inner tubular member, each said end cap having an outwardly flared opening providing a conical recess around said inner tubular member; a tubular resilient diaphragm enclosing said inner tubular member, each end of said diaphragm extending into the adjacent recess; a resilient seal of a general conical cross-section mounted in each recess on said tubular member and telescoped inside the end of said diaphragm; a seal retainer secured to each said end cap and in general abutting relation to said inner tubular member thereby forcing said seal and diaphragm against said end cap and against said inner tubular member; means for connecting both said seal retainers to a liquid line; and means for maintaining gas under pressure in said annular space around said diaphragm.

3. An accumulator comprising an inner tubular member, there being a plurality of lateral narrow slots formed in said tubular member and each said slot being about 120° of revolution of the periphery thereof; an outer tube enclosing said inner tubular member providing an annular space therebetween and including an end cap sealed on each end thereof, each said end cap provided with a central opening permitting passage of said inner tubular member, each said end cap having an outwardly flared opening providing a conical recess around said inner tubular member; a tubular resilient diaphragm enclosing said inner tubular member, each end of said diaphragm extending into the adjacent recess; a resilient seal of a general conical cross-section mounted in each recess on said tubular member and telescoped inside the end of said diaphragm; a seal retainer secured to each said end cap and in general abutting relation to said inner tubular member thereby forcing said seal and diaphragm against said end cap and against said inner tubular member; means for connecting both said seal retainers to a liquid line; and means for maintaining gas under pressure in said annular space around said diaphragm.

4. An accumulator according to claim 3 in which a fine mesh screen covers said slots.

References Cited
UNITED STATES PATENTS

| | | | |
|---|---|---|---|
| 2,760,518 | 8/1956 | Peet | 138—30 |
| 2,875,786 | 3/1959 | Shelly | 138—30 |

FOREIGN PATENTS

| | | |
|---|---|---|
| 241,065 | 10/1962 | Australia. |
| 1,282,224 | 12/1961 | France. |

LAVERNE D. GEIGER, *Primary Examiner.*

T. L. MOORHEAD, *Assistant Examiner.*